Figure 3:
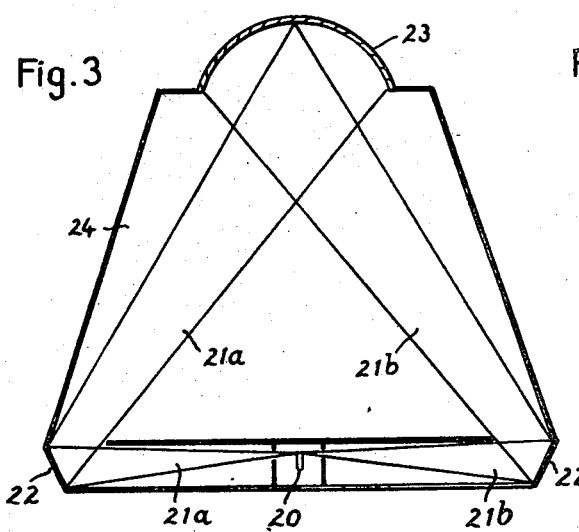

March 1, 1960     R. H. W. KEEBLE     2,926,561
PANORAMIC PICTURE SYSTEM
Filed Jan. 30, 1956     2 Sheets-Sheet 1
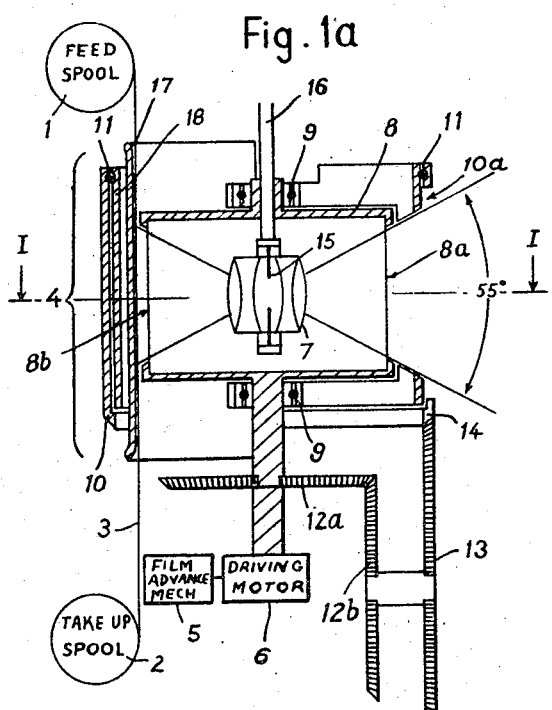
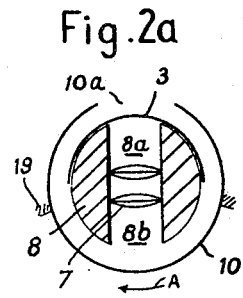
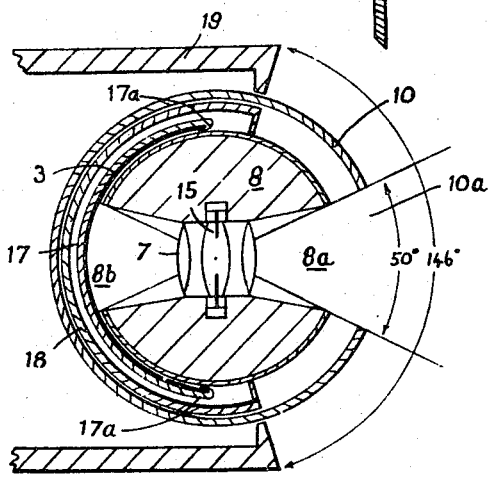
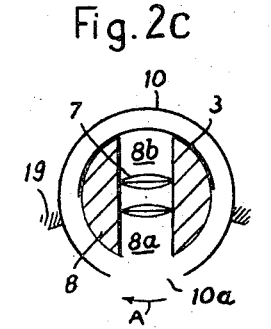
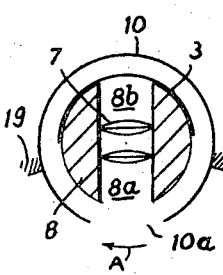
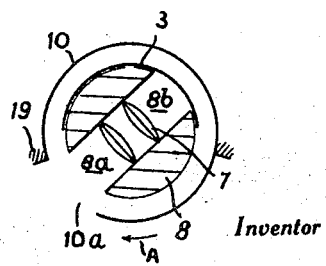
Inventor
Roy Herbert William Keeble
By
Attorneys March 1, 1960 R. H. W. KEEBLE 2,926,561
PANORAMIC PICTURE SYSTEM
Filed Jan. 30, 1956 2 Sheets-Sheet 2

Inventor
ROY HERBERT WILLIAM KEEBLE.
By
Holcombe, Wittenill & Buelow
Attorneys

United States Patent Office 2,926,561
Patented Mar. 1, 1960

2,926,561

PANORAMIC PICTURE SYSTEM

Roy Herbert William Keeble, Bletchingley, England

Application January 30, 1956, Serial No. 562,332

Claims priority, application Great Britain
February 3, 1955

5 Claims. (Cl. 88—16)

The present invention relates to a system for photographing and projecting panoramic pictures, and more particularly for the photographing and projection of panoramic motion picture films, although the system can also be applied to single pictures or slides.

A known system for producing panoramic motion pictures requires the provision of two or more cameras for taking the pictures and two or more projectors for projecting the pictures on a screen. This gives rise to variations and inequalities between different parts of the reproduced panoramic picture.

It is an object of the present invention to provide an improved system in which only one camera is required for producing a panoramic picture and only one projector for projecting the picture on a screen.

It is a further object of the invention to provide an improved camera for producing panoramic pictures and an improved projector for showing such pictures.

It is yet a further object of the invention to provide an optical arrangement for the projection of panoramic pictures which can be readily incorporated in existing types of picture projector.

From one aspect the invention provides a system for photographing and projecting panoramic pictures, in which a picture is recorded on a film medium which is curved about an axis normal to the optical axis of the picture-taking lens system at least over the area on which the picture is to be recorded, the lens system is rotated about said first-mentioned axis during exposure of the film medium so as to record the picture on the area of film medium by a scanning movement across said area in the plane of curvature of the film medium, and the picture is reproduced by projection through a projector including means whereby the light passing through the picture which impinges upon a viewing screen curved so that its side edges are nearer to the point of view than its centre, produces a panoramic picture in which the distortion produced in the camera is substantially corrected or not noticeable.

The invention also consists in a camera for photographing panoramic pictures, comprising a lens system, means for supporting a film medium in a curved position substantially in the focal plane of the lens system, means for rotating said lens system from side to side across the film medium and a rotating shutter mechanism which is opened as the lens scans from side to side across the film.

The invention also consists in a projector for projecting panoramic pictures, comprising means for passing light through the picture, means for splitting the light passed through the picture into at least two paths, means for passing each of the paths through an optical system and means for directing the light from the optical systems on to a curved screen to reproduce the panoramic picture. Instead of splitting the light beam passing through the projector, the picture in the projector may be effectively curved about a radius similar to that employed in the camera and projected through a cylindrical lens system.

Figure 6:
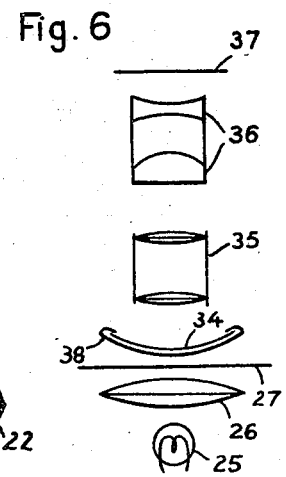
Figure 4:
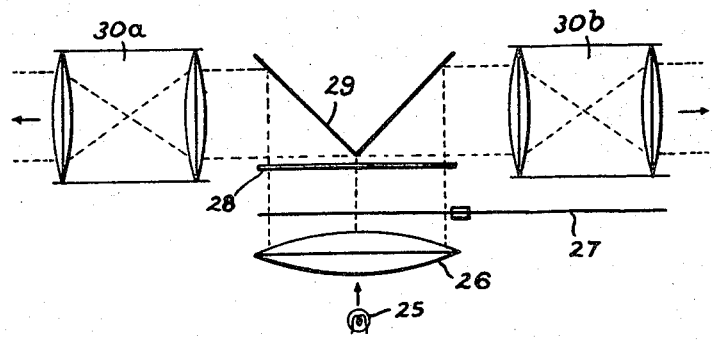
Figure 5:
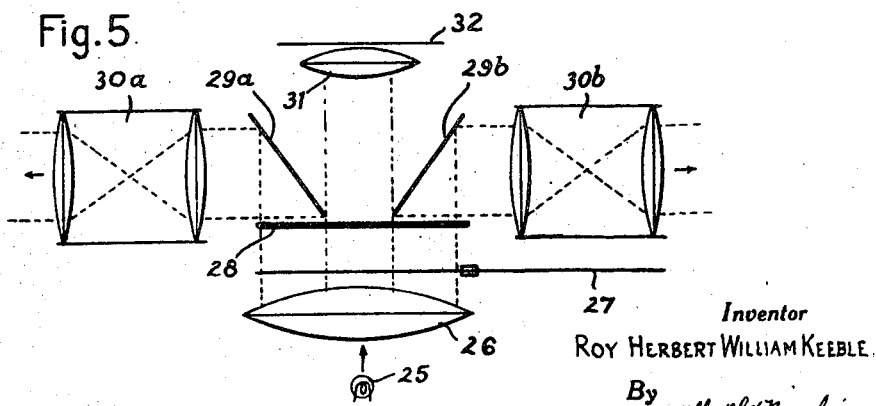

In order that the invention may be more fully understood reference will now be made to the accompanying drawings, in which:

Figure 1a is a diagrammatic representation of a camera according to the invention, part of the mechanism being shown as a vertical section, Figure 1b is a horizontal section taken on the line I—I in Figure 1a, Figures 2a, 2b, 2c and 2d are diagrams explaining the operation of the camera shown in Figures 1a and 1b, Figure 3 is a diagrammatic representation of a picture projection arrangement according to the invention, Figure 4 is a diagram of the optical system of a projector according to the invention, Figure 5 is a modification of the optical system of Figure 4, and Figure 6 is a diagram of the optical system of another form of projector according to the invention.

Referring to Figures 1a and 1b, there is shown a camera for taking motion pictures comprising a film feed spool 1 and film take-up spool 2. A film 3 extends between the spools 1 and 2 and passes through an area 4 defining the film gate in which each picture is recorded on an area of the film. The camera also includes a film advance mechanism indicated at 5 driven by a driving motor 6, which also drives the lens and shutter mechanism as will be hereinafter explained.

The lens consists of a plurality of lens elements 7 mounted in a drum 8 which is supported in bearings 9 so that it can rotate about a vertical axis passing through the optical centre of the lens system 7. Apertures 8a and 8b are provided in opposite side walls of the drum whereby a view can be imaged by the lens system 7 upon the portion of the film within the film taking gate 4. The lens drum is surrounded by a cylindrical light shield 10 which is mounted in bearings 11 so that it can rotate with the lens drum 8. The cylindrical light shield is formed with an aperture 10a which operates in conjunction with the apertures 8a and 8b as a focal plane shutter. The lens drum 8 and cylindrical light shield 10 are driven at the same speed from the driving motor 6. The light shield 10 is driven from the shaft driving the lens drum 8 through a gear 12a on that shaft which engages with a similar gear 12b which is mounted on a shaft also carrying a further gear 13, the latter gear in turn engages a toothed rim 14 provided on the cylindrical light shield 10. An adjustable iris diaphragm mechanism 15 which is controlled through a hollow shaft 16 supporting the lens drum allows for variation in the lens aperture. The lens drum may also incorporate a focussing mechanism (not shown).

Where the film passes through the gate 4 it is curved over a cylindrical surface substantially in the focal plane of the lens system 7 and is supported in this curved position between the lens drum 8 and light shield cylinder 10, by means of a support member 17, the edges of the film engaging in grooves 17a formed in the edges of this member. A light trap 18 is also provided to ensure that the apparatus is light tight when the light shield is closed, and at 19 is shown part of the outer casing.

In operation, when an area of the film 3 on which a picture is to be recorded is arranged within the gate 4, the lens drum 8 and cylindrical light shield 10 revolve and scan from side to side across the area of the film 3, in the manner of a focal plane shutter thereby exposing the film through the aperture 10a in the light shield 10. When the drum 8 has revolved far enough to expose the film, the cylindrical light shield with the aperture 10a has also rotated through the same angle and then the non-apertured part of the light shield closes across the front aperture of the camera thereby terminating the exposure while the drum and light shield complete their rotation and open again in time to expose the next area of the film. Such an arrangement avoids any reverse flow of light on to the film. Figure 2 shows diagrammatically one sequence of rotation of the lens and light shield mechanism. In Figure 2a the cylindrical light shield 10 is closed, whilst Figures 2b, 2c and 2d show respectively the rotation of the lens drum 8 across the film 3 from side to side in the direction of the arrow A, from the moment when the light shield aperture 10a commences to expose the film until just before it commences to move into the camera casing and so terminate the exposure.

The rotating speed of the lens and light shield assembly is synchronised to the number of pictures being photographed per second. The movement of the film takes place whilst the light shield is closed and the film may be advanced to the gate 4 by any desired amount, for example 6 sprocket holes at a time. Whilst the film is in the taking gate 4 it may be clamped in position against the support 17. It will be understood that the film is only curved about a vertical axis substantially in the area of the taking gate and is wound and unwound from the spools 1 and 2 in the normal flat condition.

The camera described is intended to photograph 146° x 55° pictures on a single film, the film being about twice the width of standard 35 mm. motion picture film. If desired the angle of take can be extended up to the order of 170° x 55°.

Referring now to Figure 3, there is shown diagrammatically an arrangement for projecting pictures produced by the camera just described with reference to Figures 1 and 2. In this arrangement, a projector 20 is provided with an optical system to split the light passing through the film into two parts which are projected laterally in opposite directions to form two beams 21a and 21b. Both of the beams impinge upon mirrors 22 positioned so as to reflect the beams on to a curved screen 23 in such a manner that the beams re-unite to form a panoramic picture on the screen. It will be noted that each of the beams covers half the surface of the screen and impinges substantially normally on to the part cylindrical surface which they cover. The screen 23 forms part of a cylindrical surface and covers an arc substantially corresponding to the arc covered by the curved portion of the film in the taking position in the camera when the picture is being photographed in order to avoid anamorphosis of the reproduced image. Figure 3 shows the projection arrangement as mounted in a cinema, the auditorium being indicated at 24 and the mirrors 22 being mounted at the rear corners of the auditorium.

The optical system incorporaed in the projector 20 is shown in detail in Figure 4, and referring now to this figure, light from a source 25 passes through a condenser 26 and a shutter 27 to impinge upon the film 28. The light passing through the film is split into two paths by means of a reflector 29, for example of stainless steel. This reflector is V-shaped with the apex of the V (which must be knife-edge sharp) positioned as near as possible and parallel to the surface of the film along the vertical centre line. The light path from each half of the film is then reflected in opposite directions respectively into two projection lens systems 30a and 30b, the light from these systems impinging upon the two mirrors 22 shown in Figure 3. Focussing means are provided in the projector for focussing the picture on the screen and if desired focussing means may also be provided in the projection lens systems 30a and 30b. By reason of the fact that the two light beams 21a and 21b are of equal length, the beams are re-united correctly upon the screen 23 to produce the panoramic picture.

In an alternative projection arrangement shown in Figure 5, the light from the film 28 is split into three parts and two stainless steel reflectors 29a and 29b are provided which are spaced so that the centre beam passes between the reflectors and through a projection lens system 31 from whence it is thrown directly on to the central portion of the screen 23. The two outer beams are respectively directed in opposite directions through the projection lens systems 30a and 30b and reflected on to the screen by the mirrors 22 as previously described. The lens system 31 is arranged to give the same size magnification for the shorter light path to the screen as the magnification produced for the light paths projected by the mirrors 22. A neutral filter 32 may be associated with the lens system 31 in order to balance the loss of intensity caused by the reflection of the outer beams by the mirrors 22.

Figure 6 shows an optical system of another projector according to the invention in which the film 34 is held curved about an axis normal to the optical axis of the projector lens system, the radius of curvature being equal to the radius of curvature employed in the camera taking the picture. In this case the picture on the film 34 is compressed in width whereby a picture taken, for example, on 70 mm. film may be printed on standard 35 mm. film. Light from the source 25 passes through condenser 26 and shutter 27, and the light passing through the film 34 passes through the projection lens system 35 and then through a cylindrical lens system or anamorphoscope 36 which removes the compression present in the film. The light from lens system 36 impinges upon a screen as previously described to produce the panoramic picture. If desired a graded filter 37 may be positioned in front of the lens system 36 to compensate for variations in the intensity of the light impinging upon different portions of the screen. Alternatively the intensity of the light source 25 can be varied across the width of the film. The film is held in the curved position by means of a curved guide 38 provided with an aperture to pass light through the film. Alternatively a transparent guide of appropriate curvature may be employed.

The angle subtended by the curved support 38 depends upon the amount of compression given to the film. For example, if the film taken is compressed into one half width, the angle subtended by the support 38 is one half the angle subtended by the curved support in the camera. Thus if a curvature over 146° is employed in the camera, the curvature of the member in the projector will be 73°. Similarly if the film is compressed to one-third, the angle subtended by the curved member in the camera will be one-third that subtended by the curved support in the camera.

In a modification of the arrangement of Figure 6, instead of curving the support for the film 34 the film remains flat and an appropriately designed cylindrical lens is inserted between the film and the projection lens system 35 which produces an image having the required curvature.

It will be seen that with the system according to the invention employing a single camera and projector a panoramic picture can be produced in which the parts are accurately matched, and in which the joining line between adjacent parts of a reproduced picture is substantially not visible once the projector has been accurately focussed and aligned upon the screen. Furthermore, any irregularities in the running of a motion picture film through the projector will affect the whole picture and not one part of the picture relative to another as is the case where two or more projectors are used and irregularities can occur between the different projectors. Such irregularities will therefore tend to be less noticeable and to have less effect upon the panoramic picture with the system according to the present invention.

Whilst particular embodiments have been described it will be understood that various modifications may be made without departing from the scope of the invention. For example, the invention may be applied to the projection of slides and still pictures as well as for the projection of panoramic motion pictures as particularly described. Furthermore, the camera according to the invention may be arranged for taking single pictures in which case the rotating lens and light shield mechanism would be controlled to make one complete revolution for each exposure. Such a camera could be made to a small size and be arranged to accommodate any desired width of film, for example standard 35 mm. film.

A camera according to the invention, either constructed as a cine-camera or a still picture camera may be employed as a recording instrument in confined spaces such as aircraft interiors, or instrument bays where its taking area of 146° x 55° or greater could do the work of three or more standard cameras.

It will also be understood that pictures produced by the system according to the present invention may also be projected upon a normal flat screen if suitable correction is made in the optical system of the projector for the anamorphosis produced in the picture by the camera. If desired copies for projection on a normal flat screen may be printed anamorphosised on normal 35 mm. film.

I claim:

1. In a motion picture camera for photographing panoramic pictures, a lens system, a rotatable housing supporting said lens system and adapted to rotate about a fixed axis passing through the optical centre of the lens system, means for supporting a film medium in a curved postion substantially in the focal plane of the lens system, a cylindrical light shield having an aperture therein, means supporting said light shield about said lens housing and said film supporting means, means for rotating said light shield and said lens housing at substantially constant speed so that light passes through said aperture and the lens system on to the film medium during a period when the lens system is scanning over the surface of the film medium, means for advancing the film medium during periods when the light shield cuts off light from the film medium and means for synchronising the film advancing mechanism with the rotation of the lens housing and light shield.

2. In a motion picture camera for photographing panoramic pictures over an angle of at least 140°, a symmetrical lens system, a rotatable housing supporting said lens system, and adapted to rotate about a fixed axis passing through the optical centre of the lens system, means for supporting a film medium in a curved position substantially in the focal plane of the lens system, a cylindrical light shield having an aperture therein, arranged about said lens housing and said film supporting means, means for rotating said light shield and said lens housing at substantially constant speed so that light passes through said aperture and the lens system on to the film medium during a period when the lens system is scanning over the surface of the film medium, means for advancing the film medium during periods when the light shield cuts off light from the film medium and means for synchronising the film advancing mechanism with the rotation of the lens housing and light shield.

3. A camera for photographing panoramic pictures comprising a lens system, a rotatable cylindrical housing supporting said lens system, and adapted to rotate about a fixed axis passing through the optical centre of the lens system, means for supporting a film medium in a curved position substantially in the focal plane of the lens system, a cylindrical light shield having an aperture therein, arranged about said cylindrical lens housing and said film supporting means and means for rotating said light shield and said lens housing at substantially constant speed so that light passes through said aperture and the lens system on to the film medium during a period when the lens system is scanning over the surface of the film medium.

4. A camera for photographing panoramic pictures comprising a symmetrical lens system, a rotatable housing supporting said symmetrical lens system and adapted to rotate about a fixed axis passing through the optical centre of the lens system, means for supporting a film medium, in a curved position substantially in the focal plane of the symmetrical lens system, a light shield having an aperture therein, and arranged about said lens housing and said film supporting means and means for rotating said light sield and said lens housing at substantially constant speed so that light passes through said aperture and the lens system on to the film medium during a period when the lens system is scanning over the surface of the film medium.

5. A camera for photographing panoramic pictures over an angle of at least 140° comprising a lens system, a rotatable housing supporting said lens system and adapted to rotate about a fixed axis passing through the optical centre of the lens system, means for supporting a film medium in a curved position substantially in the focal plane of the lens system, a light shield having an aperture therein and arranged about said lens housing and said film supporting means, and means for rotating said light shield and said lens housing at substantially constant speed so that light passes through said aperture and the lens system on to the film medium during a period when the lens system is scanning over the surface of the film medium.

References Cited in the file of this patent

UNITED STATES PATENTS

| | | |
|---|---|---|
| 778,394 | Angsten et al. | Dec. 27, 1904 |
| 1,330,447 | Pech | Feb. 10, 1920 |
| 1,482,503 | Ames | Feb. 5, 1924 |
| 1,489,988 | Dickinson | Apr. 8, 1924 |
| 1,783,463 | Elms | Dec. 2, 1930 |
| 1,836,584 | Elms | Dec. 15, 1931 |
| 2,542,789 | Ames | Feb. 20, 1951 |
| 2,660,087 | Domeshek | Nov. 24, 1953 |

OTHER REFERENCES

"Taking and Projecting Motion Pictures," Hardy et al., vol. 12, No. 33, pages 117–125 (1928), Journal of the Society of Motion Picture Engineers.

"Distortion in Motion Pictures," Tuttle, vol. 21, pages 198–208, September 1953, Journal of the Society of Motion Picture Engineers.

"Shape, Area, and Technic of Pictures," Schlanger, vol. 24, pages 402–409, May 1935, Journal of the Society of Motion Picture Engineers.